(12) United States Patent
Foreman et al.

(10) Patent No.: US 8,141,014 B2
(45) Date of Patent: Mar. 20, 2012

(54) SYSTEM AND METHOD FOR COMMON HISTORY PESSIMISM RELIEF DURING STATIC TIMING ANALYSIS

(75) Inventors: Eric A. Foreman, Essex Junction, VT (US); Peter A. Habitz, Essex Junction, VT (US); David J. Hathaway, Essex Junction, VT (US); Jeffrey G. Hemmett, Essex Junction, VT (US); Kerim Kalafala, Hopewell Junction, NY (US); Jeffrey P. Soreff, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 12/538,229

(22) Filed: Aug. 10, 2009

(65) Prior Publication Data
US 2011/0035714 A1    Feb. 10, 2011

(51) Int. Cl.
*G06F 17/50* (2006.01)
(52) U.S. Cl. .......... 716/108; 716/113; 716/136
(58) Field of Classification Search .......... 716/108, 716/113, 136; 703/16
See application file for complete search history.

(56) References Cited

U.S. PATENT DOCUMENTS

| | | | |
|---|---|---|---|
| 6,476,645 | B1 | 11/2002 | Barnes |
| 6,643,804 | B1 | 11/2003 | Aipperspach et al. |
| 6,798,261 | B1 | 9/2004 | Bhushan et al. |
| 6,816,824 | B2 | 11/2004 | Chuang et al. |
| 6,833,737 | B2 | 12/2004 | Aipperspach |
| 6,960,926 | B2 | 11/2005 | Anderson et al. |
| 2002/0016705 | A1 | 2/2002 | Kroell et al. |
| 2006/0033646 | A1 | 2/2006 | Dreps et al. |
| 2006/0277513 | A1 | 12/2006 | Visweswariah |
| 2008/0068099 | A1 | 3/2008 | Blushan et al. |

OTHER PUBLICATIONS

U.S. Appl. No. 12/484,293, filed Jun. 15, 2009, Office Action dated Jun. 23, 2011.
U.S. Appl. No. 12/484,293, filed Jun. 15, 2009, Notice of Allowance dated Sep. 22, 2011.

*Primary Examiner* — Sun Lin
(74) *Attorney, Agent, or Firm* — Ryan K. Simmons; Hoffman Warnick LLC (57) ABSTRACT

A system and method for adjustment of modeled timing data variation as a function of past state and/or switching history during static timing analysis. One illustrative embodiment may include inputting and asserting at least one of initial signal history bound and explicit device history bound constraints for at least one signal of a circuit design and evaluating for a segment processed during a forward propagation of block based static timing analysis whether any input signal to a current segment has a bounded history, at least one of propagated and asserted. The method may further include evaluating for the segment whether history bounds are downstream from a gating restriction, and processing a next segment until there are no further segments.

23 Claims, 3 Drawing Sheets

SYSTEM AND METHOD FOR COMMON HISTORY PESSIMISM RELIEF DURING STATIC TIMING ANALYSIS

BACKGROUND

1. Technical Field

The disclosure relates generally to a system and method for static timing, and more particularly to a system and method for adjustment of modeled timing data variation as a function of past state and/or switching history during static timing analysis.

2. Background Art

One dominant form of performance analysis used during integrated circuit (IC) design is static timing analysis (STA). STA is an important process by which one identifies any circuit races/hazards which could cause a chip to malfunction, verifies the operational speed of a chip, and identifies the paths which limit the operational speed. STA typically operates on a timing graph, in which nodes represent electrical nodes (e.g., circuit pins) at which signals may make transitions at various times, and edges, or segments, representing the delays of the circuits and/or wires connecting the nodes. Although it may report performance-limiting paths, typical STA methods do not actually operate on paths (of which there may be an exponentially large number), and instead use a "block-based" approach to compute and propagate forward signal arrival times reflecting the earliest and/or latest possible times that signal transitions can occur at nodes in the timing graph. As a result, STA is extremely efficient, allowing for rapid estimation of IC timing on very large designs as compared to other approaches (e.g., transient simulation). STA also provides accurate timing estimates without any knowledge of the function of the design being timed, and therefore can operate in the absence of any specific input signals. However, this last trait makes STA particularly sensitive to delay variation resulting from the past device state and/or switching history of the modeled device, as it results in a lack of explicit availability of this information. From here forward, the past device state and/or switching history will be referred to as 'device history', or simply 'history' where appropriate.

An important aspect of STA is evaluation of timing tests, which are required ordering relationships between the arrival times of signals on converging paths. These are often represented in a timing graph as test edges, or segments, with associated guard times indicating the required separation between the signal arrivals at the test edge endpoints. Common examples of timing tests are setup tests, requiring that a data signal at an input of a flip-flop or other memory element becomes stable for some setup period before the clock signal transition that stores that data (i.e., that the latest possible data transition in a clock cycle occur at least the required setup period before the earliest possible clock transition for that cycle), and hold tests, requiring that a data signal at an input of a flip-flop or other memory element remain stable for some hold period before the clock signal transition that stores that data (i.e., that the earliest possible data transition in a clock cycle occur at least the required hold period after the latest possible clock transition for the preceding clock cycle). Pairs of paths along which early and late arrival times compared in a timing test are propagated are often referred to as racing paths. Although STA is typically performed at a particular "corner," which is a specified combination of conditions such as voltage, temperature, and manufacturing process that affect delays of circuits on a chip, local variations in these and other parameters may cause variations in timing data of similar circuits in different locations on a chip. Timing data subject to variation are most commonly delay values, but may also comprise slews, guard times, arrival times, required arrival times, and other values. A common way to account for this variation in STA is to compute minimum and maximum delays for circuits, using minimum (or fast) delays to determine early signal arrival times and maximum (or slow) delays to determine late signal arrival times.

The aforementioned variations in device history can be one cause of such delay variation when digital ICs are manufactured using Partially Deleted (PD) Silicon on Insulator (SOI) technology, wherein the device body may be electrically insulated from the substrate. SOI technology can provide benefits such as improved performance and reduced power consumption. However, drawbacks exist as well, one in particular being that devices with PD-SOI technology suffer from a history effect, wherein the performance of a given device can be a function of the state history of that device, as the varying charge stored on the floating body of the device dynamically alters the threshold voltage of the device during operation. One related art method of reducing pessimism due to body charge in PD-SOI is described in U.S. Pat. No. 6,816,824, which also describes in more detail the manner in which the body charge varies due to changes in device state, and which is incorporated herein by reference. It describes determining a range of possible body charge or voltage values for a device based on connectivity of a device within a circuit (in particular whether it is tied to a power supply rail), but assumes the most extreme range possible over all possible device histories, and does not consider the actual possible state histories of the device.

An alternate example of delay variation occurring as a result of device history would be switching history based temperature fluctuations. Switching of devices causes power dissipation and local self-heating of the devices and wires conducting the switching signals. A device or wire that switches rapidly generates more heat and will heat up relative to its neighboring devices and wires, and this change in temperature can alter the electrical characteristics, and hence the delay, of those devices and wires. Because heat conduction on an integrated circuit is typically slow relative the circuit switching speeds, this local change in temperature due to switching will typically persist for several clock cycles, so the delay change of a switching event due to switching-induced self-heating will be a function of the switching history over some number of clock cycles immediately preceding the switching event.

Yet another example of delay variation due to device history is NBTI, or negative bias temperature instability, in which cumulative switching over very long periods (e.g., the life of the circuit) cause degradation in the performance of PFETs. The degree of degradation depends on the cumulative number of times the device has switched. In this case, the time window over which history must be considered is much longer than for PD-SOI body history or switching-induced self-heating.

Still another example of delay variation due to device history is the hot carrier effect, where the strong electric field across the gate insulator of a conducting FET cause carriers to be injected into the gate insulator and trapped, causing a gradual change in the device characteristics. The degree of degradation depends on the cumulative time the device has been in the on state, and as with NBTI, the time window over which history must be considered is much longer than for PD-SOI body history or switching-induced self-heating.

In all of the preceding cases, some aspect of the history (e.g., switching, state) of a circuit element (e.g., a wire or transistor) over some preceding period (e.g., several clock cycles, or the entire operating history of the device) causes an alteration in the delay of the device.

While sufficiently conservative to ensure working hardware, using a fast/slow delay range that accounts for the full range of possible device history is typically overly pessimistic. While in some cases it may be possible for the modeled fast/slow cases to simultaneously exist for different elements on the same integrated circuit (and STA must ensure functional hardware in this event), this will frequently not be the case. This situation therefore introduces pessimism that places an artificial constraint on the performance of the integrated circuits (ICs) produced, scaling back the potential physical performance as a result of design tool limitations. Therefore it is very desirable to have an approach that can leverage any available knowledge in order to minimize this pessimism to help expedite timing closure (closure occurs when all timing requirements are satisfied) and/or increase the performance levels at which timing may close. As mentioned above, very little such information exists explicitly with regards to history in STA. However, history based pessimism can have a significant impact on the separation between fast and slow delays, and so some technique for identifying and minimizing history based pessimism would be very beneficial.

One related art means of reducing pessimism in STA is through the Common Path Pessimism Removal (CPPR) approaches described in U.S. Pat. Nos. 5,636,372 and 7,117, 466. CPPR removes the part or all of the fast/slow delay difference from arrival time differences computed at timing tests between paths sharing common portions or parametric dependencies (e.g., sensitivities to process variation). However, as currently practiced, CPPR contains a limitation as applied to reducing history based pessimism, as this approach only removes pessimism for sources of fast/slow delay only where the two signals comprising the timing test traverse a common path, and/or in the case of generalized CPPR (gCPPR) share a clearly defined common parametric dependency. This allows for credit in instances where history based delay variations follow a common path, but additional work is required for credit along the non-common portions.

Another related art means of reducing pessimism in STA is through the Statistical Static Timing Analysis (SSTA) approach, described in U.S. Pat. Nos. 7,428,716 and 7,512, 919. SSTA explicitly propagates mean timing values and sensitivities of these timing values to sources of variation through the timing graph, based on modeled variability information contained in asserted timing constraints and the delay models. These sensitivities may then cancel when arrival time differences are computed at test slack calculation time, providing pessimism reduction during the original block based timing analysis. Statistical min/max operations are used to compute early and late mode arrival times, respectively, when paths converge, including computing both new mean values and sensitivities to various parameters. These statistical min/max operations also produce binding probabilities, indicating the probability that a particular input to the min/max operation produces the actual min/max value. However, as currently practiced, SSTA propagates only statistical sources of variation, which history based delay variations are not.

BRIEF SUMMARY

A first aspect of the disclosure provides a method for adjustment of modeled timing data (e.g., delay) variation as a function of past state and/or switching history during static timing analysis. The method may comprise: at least one of inputting and asserting initial signal history bounds for at least one signal of a circuit design; evaluating for a segment processed during a forward propagation of block based static timing analysis whether any input signal to a current segment has a bounded history, at least one of propagated and asserted; evaluating for the segment whether history bounds are downstream from a gating restriction; and processing a next segment until there are no further segments.

A second aspect of this invention provides a program product stored on a computer readable medium, which when executed, adjusts modeled timing data variation as a function of past state and/or switching history during static timing analysis. The program product may comprise: program code for at least one of inputting and asserting initial signal history bounds for at least one signal of a circuit design; program code for evaluating for a segment processed during a forward propagation of block based static timing analysis whether any input signal to a current segment has a bounded history, at least one of propagated and asserted; program code for evaluating for the segment whether history bounds are downstream from a gating restriction; and program code for processing a next segment until there are no further segments.

In either of the first or second aspects, illustrative embodiments may include post-processing, wherein during gCPPR, one or more history component are at least partially cancelled in a test where both sides of the test are found to share a common gating restriction (including neither side having a restriction) and SSTA propagation, wherein during SSTA propagation, one or more history parameters are loosely treated as sources of variation (propagated, but do not contribute to min/max operations), with one unique parameter per history bound and gating restriction combination.

A third aspect of the invention provides a system for pessimism reduction during the static timing in cases where the propagation delay may be a function of device history. The system may comprise a processor; a memory; and a static timing engine stored in the memory and operable to be executed by the processor, wherein the static timing engine is structured to execute methods of the invention.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As indicated above, the disclosure provides a system and method for pessimism reduction during STA or SSTA in cases where a bounded device history which reduces the modeled timing data variation may be defined and propagated, and furthermore where this bounded device history is conditional upon relevant signal gating information. Although the detailed description will discuss timing data in terms of delay, it is understood that timing data may include other values such as slews, guard times, arrival times, required arrival times, and other values.

It is possible under some conditions to define bounds on the possible history based delay variation, and then leverage these bounds to reduce the history induced timing pessimism. In the cases of either the PD-SOI or temperature induced variation, if some knowledge exists regarding the switching behavior of the propagated signals (e.g., known clock signals operating at a specified frequency), it may be possible to infer bounds on the possible history based delay variation, reducing the required split between fast and slow delays. For example, in the temperature case, a signal with a great deal of constant activity will experience more local heating and therefore may operate at a more constant (higher) local temperature, causing it to experience less timing data (delay) variation than signals with a wider range of activity (i.e., signals whose dormancy allows significant local heat dissipation, but also see periods of intense activity resulting in significant local heating). The same can be said for signals with infrequent sporadic activity (where the latent period between any switching is sufficient to avoid appreciable local heating), and whose paths may remain at relatively constant (lower) temperatures. Similarly for PD-SOI, signals experiencing regular transitions at a frequency sufficient to prevent significant charge leakage from the device body will operate with reduced delay variability relative to signals with no such constant transitioning and the resultant wider fluctuation in body charge. Similar reductions in history-dependent delay variation can be determined for elements for which some information about long term switching frequencies (for NBTI based delay variation) or probabilities of being in the "on" state (for hot carrier effects) is known.

This activity knowledge may therefore be leveraged to place bounds on the amount of history based delay variation required, such that the required fast/slow range may be reduced. During test evaluation, if the history induced delay variation for the two arrival times involved in the test are correlated, this information may be used to reduce the fast/slow split and thus the timing pessimism. An important aspect of this concept is that the actual history bounds need not necessarily be known. It is the correlation of history bounds, and not just the bounds themselves, that can provide maximum benefit. For example, when both sides of a test are found to be bounded in a high temperature region under the same first set of conditions, and are found to be bounded in a low temperature region under the same second set of conditions, much more credit can be given than if one side may be bounded in a high temperature region and the other side in a low temperature under the same conditions (in which case perhaps no credit would be allowed). For tests occurring between signals with no known bounds correlation, the worst case scenario must be assumed (the late signal experiences the slow delay conditions—generally high temperature, and the early signal experiences the fast delay conditions—generally low temperature), and full pessimism applied.

History bounds may be propagated in various ways. Bounds on the relevant behaviors of signals (e.g., bounds on long or short term periods in which the signal may be in a given state, i.e., high or low, or on the rate of switching of the signal over a long or short term period) may be propagated with timing values or in a separate propagation step. Delays used in timing analysis may be computed using the relevant extremes of signal history and incorporated into propagated early and late arrival times. Propagation of signal history bounds may be done for all signals, or may be done only for exceptional cases where signals can be determined not to exhibit the maximum possible history variation (e.g., signals that cannot range from always low to always high over the period relevant to the history mechanism being modeled, or that cannot range from no switching to maximum frequency switching over the period relevant to the history mechanism being modeled). Such cases of other than maximum possible history variation will be referred to as tightened history bounds.

The leveraging of history bounds correlation as opposed to just the bounds themselves is very important given the widespread use of signal gating. When signal gating exists, the propagation of signals into specific portions of the IC is controlled through the use of gating elements, typically for reduced power consumption. When a given signal reaches a gating element, propagation through the element may be prevented by a control signal in order to disable portions of the design that are not required for the present task, reducing the overall power requirements for the design. Conversely, when the gated region of the design is required for a specific task, the control signal is changed to allow propagation into that region. This introduces uncertainty into the propagation of bounded history signals, as the gated signal may have to be active almost all the time (if the gate control is almost never in the gating state) or may be inactive almost all the time (if the gate control is almost always in the gating state). In the absence of specific knowledge regarding the controlling signal, determination and propagation of tightened history bounds is not possible. But conditional history bounds may be propagated, indicating that the history bounds are a function of some aspect of the design behavior (e.g., the time that a gating signal has been in a particular state). Tightened history bounds may be determined only when the design behavior upon which the history bounds depend are known to remain constant over some period, and that timing is assumed to begin once this period has been satisfied, or they may be determined for intermediate values of the design behavior. For example, in the PD-SOI case, there is a large degree of history based delay variation when a signal starts transitioning from rest, but this delay variation decreases as transitions continue, and once the delay variation has stabilized the limiting bounds may be tightly defined. For intermediate cases, where steady state has not been achieved, looser bounds may be determined by interpolating between the gated and ungated conditions, and adding some margin to account for inaccuracies in the interpolation. Similarly in the temperature based delay variation case, there is a period of heating/cooling as a signal starts/stops transitioning, and once temperature has stabilized that the limiting bounds may be tightly defined, while intermediate bounds may be determined by interpolation. It is generally useful to propagate both early and late mode arrival times (or cumulative delay variations) dependent on history effects, and bounds on the signal histories themselves, which may be used to determine device history bounds and hence delay bounds for downstream circuit elements.

The design behavior upon which history bounds depend, and which may therefore be used to determine correlation between history bounds for racing paths, will be referred to hereafter as gating conditions. These may include common control signals which gate switching signals (e.g., clocks) in different paths, control signals with known logical relationships (e.g., control signal A is "on" whenever control signal B is "on"), or conditions that force signals to switch at some minimum frequency (e.g., limit the maximum amount of time that a clock gate may block propagation of a clock signal). The signal history bounds and delays for each of the racing paths will be functions of the gating conditions. For example, when a common control signal has been on for a long time (allowing a steady state switching history state to become established on both of a pair of racing paths), a first set of history bounds may be used for each of the racing paths; while when the same control signal has been off for a long time (allowing an inactive history state to become established on both of a pair of racing paths), a second set of history bounds may be used for each of the racing paths. The actual gating condition, and hence the actual history bounds, may not be precisely known, but because the racing paths share a common gating control, an extreme pessimistic case of using the first history bounds for one of the racing paths and the second history bounds for the other of the racing paths need not be considered.

Note that when a gating condition is known (e.g., a signal is only used during IC test and not during normal operation, or it consists of some regular periodic signal that is never gated), it may be leveraged to adjust the bounds and/or their propagation accordingly and need not be considered as a gating condition that can lead to a range of delay and signal history values. For example, a control signal may always act to reduce the frequency of a clock signal, altering the history bounds in a known manner. Such information regarding known gating conditions may come from user assertions, knowledge of possible functional modes of the circuit, or other sources.

In illustrative embodiments of the invention, gating condition dependent signal history and history based delay variation may be propagated separately from original propagated timing information (which may or may not include dependencies on process variation information). Rather, some indication of the bounds on the signal history and the history based delay variation, if any exist, may be defined and propagated; this may include the history dependent component of delay variation being separated from the other delay contributions. Multiple gating conditions must also be considered during analysis. As such, one measure of history based signal history and delay variability will exist per unique gating condition, allowing for the possibility of multiple sources of bounded history based variation to be considered. Gating conditions may have discrete states (e.g., a gating control may be on or off), or may have continuous values (e.g., the amount of time since a gating control has been off). For a discrete gating condition, the difference between the fast history condition delay for the early path and the slow history condition delay of the late path may be determined for each of the discrete gating conditions. The worst (minimum) difference may then be used in the timing analysis. A frequent case is a common binary gating condition (gating is on or off) for two paths, such that two cases are possible, and thus the worst of the two delay differences (min early_gate_on–max_late_gate_on) and (min early_gate_off–max_late_gate_off) is used.

For a continuous gating condition, the minimum difference between the fast history condition delay for the early path and the slow history condition delay of the late path may be determined across the range of possible gating condition values. The worst (minimum) difference across this range may then be used in the timing analysis. Thus, different values of both early and late arrival times (history-dependent computed from minimum and maximum delays) and signal history may computed and propagated for different values of gating conditions.

There exists at least two applications for this means of evaluating and propagating at least one unique combination of history bounds and gating restriction as a source of delay variation, and obtaining credit for it:

1) gCPPR: Once an initial block based timing is complete, all failing slacks are evaluated for additional sources of credit. The initial block-based timing typically uses the unconditional extreme delays for each path, not considering gating condition correlation. Thus, a maximum delay over all possible gating conditions is used for each late mode delay segment, and a minimum delay over all possible gating conditions is used for each early mode delay segment. Once gating condition dependent history bounds have been identified as sources of delay variation, during test slack evaluation it may determined by the gCPPR method if both sides of the test share a common history bound dependency on one or more common gating condition, and if so, credit may be obtained (i.e., slack pessimism may be reduced).

2) Statistical methods: Treating the unique gating conditions as at least one of statistical and quasi-statistical sources of variation during SSTA, such that delay sensitivities to these gating conditions are propagated along with arrival time information. Then, when slacks are evaluated, sensitivities to the same gating condition will be subtracted, and may be partially or completely canceled. In the quasi-statistical approach, the history parameters are propagated as statistical variables, but do not contribute to statistical max/min operations. Instead the statistical min/max operations may be performed without consideration of the history dependent delay variation, or the history component may be recombined into the mean value prior to the max/min operation, which then proceeds as normal. That is, the minimum (generally the most negative) history dependent delay variation may be added to the mean before performing the statistical min operation, and the maximum history dependent delay variation may be added to the mean before performing the statistical max operation. To arrive at the output history contribution following the max/min operation, the pre max/min history values may be merged in a linear combination weighted by each contribution's binding probability.

Figure 1:
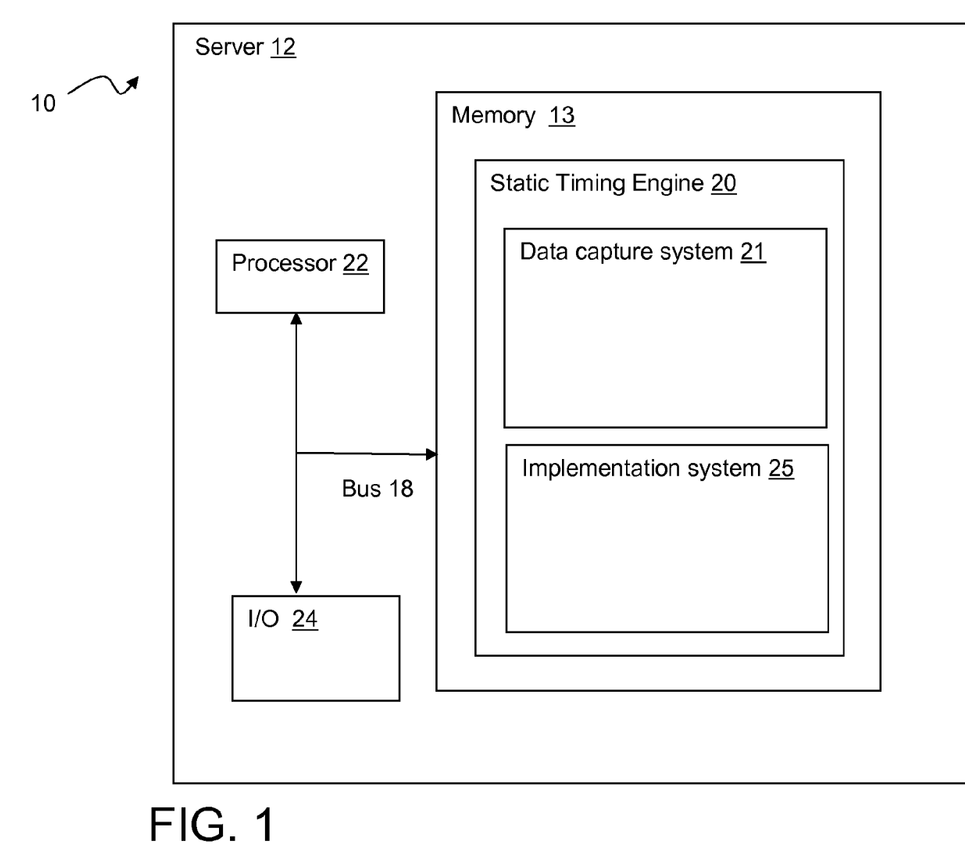
FIG. 1 shows an illustrative embodiment of a system for adjustment of modeled delay variation as a function of past state and/or switching history during static timing analysis.

FIG. 1 shows an illustrative embodiment of a system 10 for adjustment of modeled delay variation as a function of past state and/or switching history during static timing analysis. The illustrative system 10 includes a server 12 having a static timing engine 20 stored in memory 13.

The server 12 may include any computer architecture that will enable the server 12 to communicate in a network by receiving and sending signals, such as a mainframe computer, desktop computer, Personal Digital Assistant (PDA), a cellular phone, a handheld computer, a Voice over Internet Protocol (VoIP) station, etc.

Server 12 may include a processor 22, an input/output (I/O) 24, and a memory 13 for storing static timing engine 20 (e.g., as a program product that can be executed by processor 22). As is known in the art, in general, processor 22 executes computer program code that is stored in memory 13. While executing computer program code, processor 22 can read and/or write data, such as history and timing data, to/from memory 13, and/or I/O interface 24. Bus 18 provides a communications link between each of the components in server 12. I/O device 24 can comprise any device that enables a user to interact with server 12 or any device that enables server 12 to communicate with one or more other computing devices. Input/output devices (including but not limited to keyboards, displays, pointing devices, etc.) can be coupled to the system either directly or through intervening I/O controllers.

In any event, server 12 can comprise any general purpose computing article of manufacture capable of executing computer program code installed by a user (e.g., a personal computer, server, handheld device, etc.). However, it is understood that server 12 is only representative of various possible equivalent computing devices that may perform the various process steps of the disclosure. To this extent, in other embodiments, server 12 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, system 10 is only illustrative of various types of computer infrastructures for implementing the disclosure. For example, in one embodiment, system 10 may comprise two or more computing devices (e.g., a server cluster) that communicate over any type of wired and/or wireless communications link, such as a network, a shared memory, or the like, to perform the various process steps of the disclosure. When the communications link comprises a network, the network can comprise any combination of one or more types of networks (e.g., the Internet, a wide area network, a local area network, a virtual private network, etc.). Network adapters may also be coupled to the system to enable the data processing system to become coupled to other data processing systems or remote printers or storage devices through intervening private or public networks. Modems, cable modems and Ethernet cards are just a few of the currently available types of network adapters. Regardless, communications between the computing devices may utilize any combination of various types of transmission techniques.

It is understood that some of the various systems shown in FIG. 1 can be implemented independently, combined, and/or stored in memory for one or more separate computing devices that are included in system 10. Further, it is understood that some of the systems and/or functionality may not be implemented, or additional systems and/or functionality may be included as part of system 10.

The static timing engine 20 may include a data capture system 21 and an implementation system 25.

Figure 2:
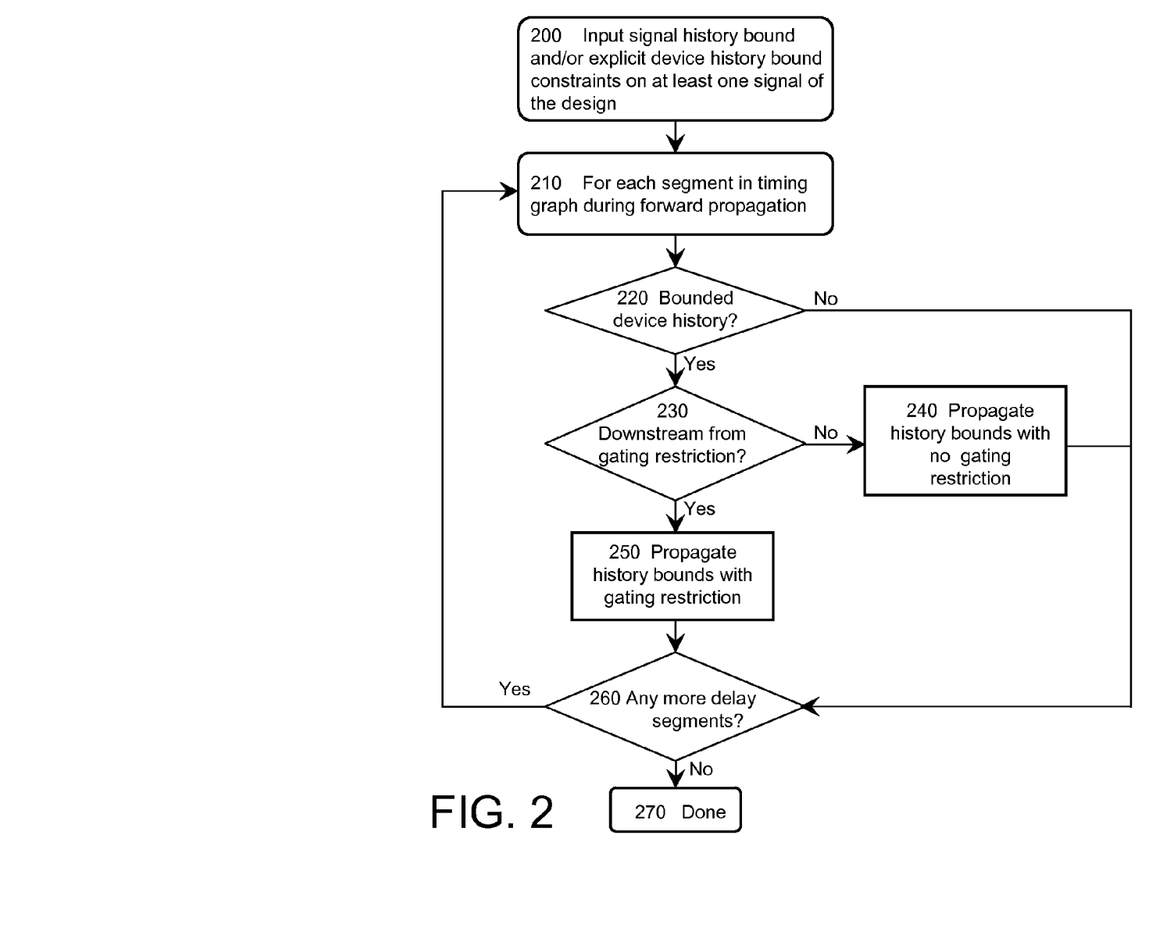
FIG. 2 shows an illustrative embodiment of conditional history bounds propagation method used in various embodiments of the invention.

FIG. 2 shows one illustrative embodiment of a method in flowchart presentation for propagating history bounds and delays conditional upon correlated gating conditions between racing paths. This method may be used to provide pessimism reduction during gCPPR-based static timing or statistical static timing analysis of technologies where the propagation delay may be a function of device history, and a bound on this history based delay variation may be defined and propagated.

The method of FIG. 2 may include applying a history credit as possible on signals containing a bounded history, and optionally a gating restriction. In embodiments of the invention, history data may be evaluated as a function of the history bounds, and optionally the gating restrictions. This data is then used to provide pessimism relief in several ways, among them: gCPPR path tracing and using the evaluated correlated history data as a source of common delay variation between racing paths during gCPPR, and statistical static timing analysis (SSTA), where the evaluated history data may be used as a source of delay variation during SSTA. In the methods of the invention, the credit may be applied on timing segments where the history component of delay has a propagated device history bound and a common gating restriction (including the case of no restriction).

As shown in FIG. 2, in process 200 input signal history bounds and/or explicit device history bound constraints on at least one signal of the design are input. For example, initial signal history bounds are input or asserted for at least one signal of a circuit design under analysis. Typically, these bounds will be input for primary inputs of the design. The form of this history bound may depend on the history-dependent variation effect being considered. For example, to account for delay variation due to PD-SOI body charge of voltage variation or hot-carrier effects, history bounds for a signal might comprise a minimum and maximum possible duty cycle of the signal during any period of time during which significant PD-SOI body charge influences due to a past device state may persist, or during the expected lifetime of the integrated circuit. The duty cycle of a digital signal is the fraction of the time the signal is high, or "true", during some specified period. For PD-SOI devices, this signal history can in turn be used to determine bounds on the period of time in which a PD-SOI device spent in certain states during any period of time during which significant PD-SOI body charge influences due to a past device state may persist. For hot carrier effects, this signal history may in turn be used to determine the fraction of the time that a device is turned on over expected lifetime of the integrated circuit. To account for delay variation due to switching-induced self-heating, or NBTI, history bounds might comprise upper and lower bounds on the number of switching events over any period of length comparable to the thermal time constant of the self-heated element or over the expected lifetime of the integrated circuit. For self-heating effects, this signal history will directly give the switching rate of the device over any period of length comparable to the thermal time constant of the self-heated element. For NBTI effects, this signal history will directly give a switching rate for a device, normalized to a clock frequency, over the expected lifetime of the integrated circuit. It may be possible in some circumstances to solely or additionally assert device history bound information directly. For example, if some specific temperature information is known for the region of the IC where the inputs apply, then this could also affect device history. A propagated signal history may also include information from which specific signal switching or duty cycle bounds may be deduced, e.g., whether a signal is a clock or data signal, or whether a clock signal is free running or potentially gated, and if gated, information uniquely identifying the gating restriction.

In a common case of a bounded signal history, a free running clock signal (one that oscillates continuously when the part is turned on) will typically have both upper and lower bounds of approximately 50% on its duty cycle. Such a clock signal will also typically have upper and lower bounds on its switching frequency equal to twice the clock frequency at which the clock oscillates (the signal has one rising and one falling transition during every clock period). Default history bound assumptions may apply to all signals that are not fed by other signals (e.g., primary inputs) and that do not have other explicit history bounds asserted. Typical default duty cycle bounds are from 0.0 (the signal is never high) to 1.0 (the signal is always high). Typical default switching frequency bounds are from 0.0 (the signal never switches) to the clock frequency (the signal switches once every clock period).

For each segment processed during a forward propagation process of block based static timing analysis (process 210), the following evaluations are performed. These evaluative processes may be performed for all segments in the design, or may be restricted to segments involved in tests which failed an initial timing evaluation performed ignoring any correlated history information (e.g., segments that had a slack less than a specified threshold, and which would therefore be examined by a gCPPR pessimism reduction process). In process 220, an evaluation is made as to whether any input signal to the current segment may have a bounded history, either propagated or asserted. If at least one segment input may have a bounded history, the method proceeds to process 230. If no input of the segment has a bounded history, the method continues to process 260, where a determination is made as to whether there are any more delay segments to be considered. If so, the process returns to process 210 to process the next segment, otherwise it proceeds to process 270, terminating the method.

In process 230, an evaluation is made as to whether the propagated history bounds are downstream from a gating restriction. A gating restriction is a point in a circuit design at which a gating condition imposes a restriction on the possible history of at least one signal or device. The restrictions may be at least one of: asserted, and propagated in with the bounded history. If the segment is found not to have a terminating condition, the method continues to process 240, where the history bound is propagated with no associated gating restriction. An example of gating restriction in the PD SOI case would be the identification of a signal gating element which is capable of terminating the propagation of the necessary duty cycle information, introducing a dependency of duty cycle downstream from that element on the control signal state of the gating element. An alternate example in the PD SOI case would be a user defined assertion indicating that the current segment terminates propagation of bounded history, although it otherwise would not appear to do so, to facilitate certain design constraints (e.g., during hierarchical timing, in instances where only a subset of the design is being timed, and the signal coming on chip is know to be gated), or an assertion that the current signal has specified history bounds dependent on some gating condition not directly inferable from the circuit design. This same example applies for a gating restriction in the case of history bound propagation for temperature based fluctuation, NBTI, and hot-carrier cases, as they similarly introduce uncertainty into the state of the signal history bounds. There may also be additional, case specific instances, for example bound propagation may be gated for temperature based fluctuations if the signal enters some portion of the design that is known to be temperature controlled. A propagation continuation assertion may also be made on a segment, indicating that a condition that would normally pose a gating restriction on history propagation should be ignored, allowing the history propagation to continue through the segment. If the segment is found to have a gating restriction, the method continues to process 250 where the history bound is propagated along with some unique indicator of the particular history bound values associated with each possible state of the gating restriction.

In process 250, the history bound is propagated along with some unique indicator of the gating restriction. A gating restriction herein is anything that can be used to identify sources of changes to a signal containing a bounded history definition across a segment, and may include at least one of: asserted restrictions, no restriction (corresponding to the base, un-gated signal), gating elements, and gating signal. Once a gating restriction has been encountered, downstream from the restriction all signals affected by the restriction are considered gated, unless some assertion is encountered which terminates the gating restriction in question at some specific level in the timing graph.

From process 250 the method proceeds to process 260, where a determination is made as to whether there are any more delay segments to be considered. If so, the process returns to process 210 to process the next segment, otherwise it proceeds to process 270, terminating the method.

Figure 3:
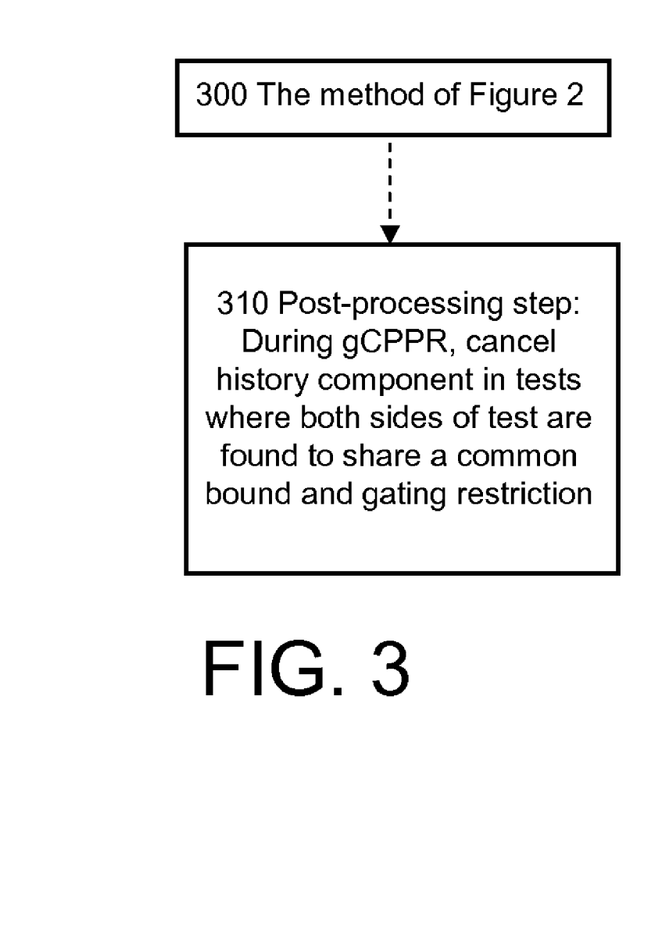
FIG. 3 shows an illustrative embodiment of a method in flowchart presentation wherein the method of FIG. 2 is applied to related art methods of STA and gCPPR.

FIG. 3 shows an illustrative embodiment of a method in flowchart presentation wherein the method of FIG. 2 is applied to the related art method of gCPPR. As shown in process 300 of FIG. 3, initially the method of FIG. 2. is applied during forward propagation to specify the unique combinations of history bound and gating restriction as a source of delay variation. Once the initial block based timing is complete, the method proceeds to process 310, wherein all failing slacks are evaluated for additional sources of credit.

For example, during gCPPR, history components are cancelled in tests where both sides of test are found to share a common bound and gating restriction. During the test slack evaluation of this process, it may determined by the gCPPR method if both sides of the test share a dependency on a common gating restriction, and if so, credit may be obtained for it. This is achieved by using most pessimistic difference between the gating restriction dependent history component from across all possible states of the gating restriction (e.g., for gating condition on and gating condition off). This is necessary as the actual history is not known, all that is known is both histories are common.

Figure 4:
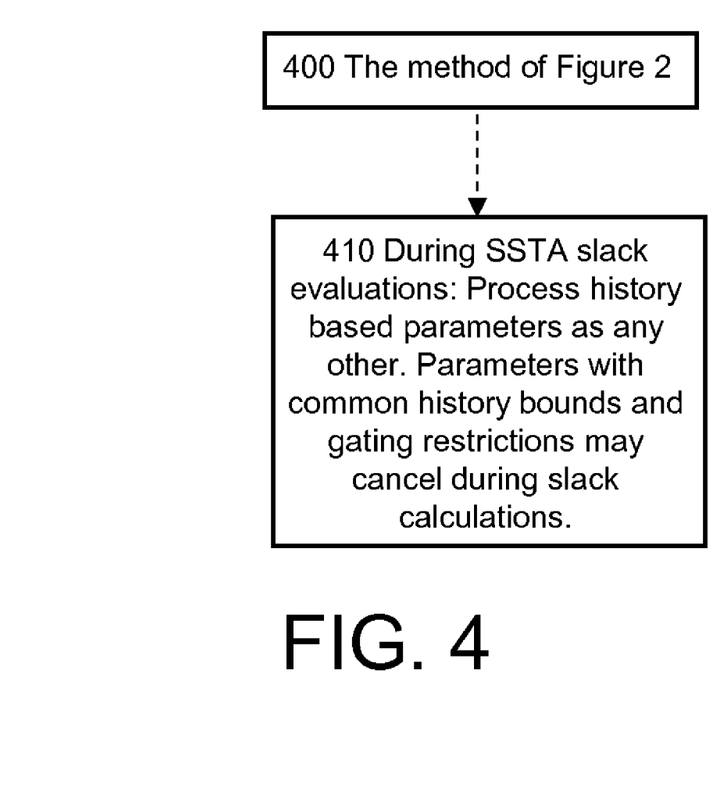
FIG. 4 shows an alternate illustrative embodiment of a method in flowchart presentation wherein the method of FIG. 2 is as applied to a related art method of SSTA.

FIG. 4 shows an alternate illustrative embodiment of a method in flowchart presentation wherein the method of FIG. 2 is as applied to the related art method of SSTA.

As shown in process 400 of FIG. 4, initially the method of FIG. 2 is applied during forward SSTA propagation to evaluate, define, and propagate unique combinations of history bound and gating restriction as at least one of statistical and quasi-statistical sources of variation during SSTA. At process 410, during SSTA slack evaluations, history based parameters may be processed as any other. Parameters with common history bounds and gating restrictions may cancel during slack calculations. In the quasi-statistical approach, the history parameters are propagated as statistical variables, but do not contribute to statistical max/min operations. Instead the history component is recombined into the mean value prior to the max/min operation, which then proceeds as normal. To arrive at the output history contribution following the max/min operation, the pre max/min history values may be merged in a linear combination weighted by each contribution's binding probability. Note that as a result of the moment matching that affects the mean value output from a statistical max/min operation, this provides an approximate solution. Then, during backward propagation and slack calculation, this source of variation is considered during all evaluations. Sensitivities to parameters representing common gating restrictions will be kept separate from the mean delay, and contributions from the racing paths converging at a test will be subtracted during slack calculations, generally resulting in at least partial cancellation, and thus providing pessimism reduction. The timing slack will then be computed assuming the gating restriction condition that causes the most pessimistic contribution of the gating restriction sensitivity to the slack (e.g., if the sensitivity is a linear coefficient to be multiplied by a gating time parameter, the maximum value of the gating time parameter will be used if the gating restriction sensitivity is negative, and the minimum value of the gating time parameter will be used if the gating restriction sensitivity is positive, as these will produce the worst slack). This is necessary as the actual history is not known, all that is known is both histories are common.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for adjustment of modeled timing data variation as a function of a past state and/or a switching history during a static timing analysis performed by at least one computing device, the method comprising:
    at least one of inputting and asserting at least one of an initial signal history bound constraint and an explicit device history bound constraint for at least one signal of a circuit design, using the at least one computing device;
    evaluating for a segment processed during a forward propagation of a block based static timing analysis whether any input signal to a current segment has a bounded history, at least one of propagated and asserted;
    evaluating for the segment whether history bounds are downstream from a gating restriction using the at least one computing device; and
    processing a next segment until there are no further segments.

2. The method of claim 1, wherein in response to the current segment not having a bounded history, further comprising proceeding directly to the processing of the next segment.

3. The method of claim 2, further comprising performing a statistical static timing analysis (SSTA) slack evaluation.

4. The method of claim 3, wherein the SSTA slack evaluation includes processing history based parameters, wherein the history based parameters with common history bounds and gating restrictions are at least partially canceled during slack calculations.

5. The method of claim 1, wherein in response to the history bounds not being downstream from the gating restriction, further comprising propagating the history bounds without a gating restriction.

6. The method of claim 1, wherein in response to the history bounds being downstream from the gating restriction, further comprising propagating the history bounds with a gating restriction.

7. The method of claim 1, further comprising performing a generalized common path pessimism removal (gCPPR) processing.

8. The method of claim 7, wherein the gCPPR processing includes canceling at least a portion of a history component in a test where both sides of the test are found to share a common bound and gating restriction.

9. The method of claim 1, wherein the timing time data of the modeled timing data variation includes a delay value.

10. A program product stored on a non-transitory computer readable medium, which when executed by at least one computing device, causes the at least one computing device to adjust modeled timing data variation as a function of a past state and/or a switching history during a static timing analysis, the program product comprising:
    program code for at least one of inputting and asserting at least one of an initial signal history bound constraint and an explicit device history bound constraint for at least one signal of a circuit design;
    program code for evaluating for a segment processed during a forward propagation of a block based static timing analysis whether any input signal to a current segment has a bounded history, at least one of propagated and asserted;
    program code for evaluating for the segment whether history bounds are downstream from a gating restriction; and
    program code for processing a next segment until there are no further segments.

11. The program product of claim 10, further comprising program code for propagating the history bounds without a gating restriction in response to the history bounds not being downstream from the gating restriction.

12. The program product of claim 10, further comprising program code for proceeding directly to the processing of the next segment in response to the current segment not having a bounded history.

13. The program product of claim 10, further comprising program code for proceeding directly to the processing of the next segment in response to the current segment not having a bounded history.

14. The program product of claim 10, further comprising program code for propagating the history bounds with a gating restriction in response to the history bounds being downstream from the gating restriction.

15. The program product of claim 10, further comprising program code for performing a generalized common path pessimism removal (gCPPR) processing.

16. The program product of claim 15, wherein the program code for gCPPR processing includes program code for canceling at least a portion of a history component in a test where both sides of the test are found to share a common bound and gating restriction.

17. The program product of claim 10, further comprising program code for performing a statistical static timing analysis (SSTA) slack evaluation process.

18. The program product of claim 17, wherein the program code for the SSTA slack evaluation includes program code for processing history based parameters, wherein the history based parameters with common history bounds and gating restrictions are at least partially canceled during slack calculations.

19. The program product of claim 10, wherein the timing time data of the modeled timing data variation includes a delay value.

20. A system for adjustment of modeled timing data variation as a function of a past state and/or a switching history during static timing analysis, the system comprising:
   a processor;
   a memory; and
   a static timing engine stored in the memory and operable to be executed by the processor, wherein the static timing engine is structured to perform:
      at least one of inputting and asserting at least one of an initial signal history bound constraint and an explicit device history bound constraint for at least one signal of a circuit design;
      evaluating for a segment processed during a forward propagation of a block based static timing analysis whether any input signal to a current segment has a bounded history, at least one of propagated and asserted;
      evaluating for the segment whether history bounds are downstream from a gating restriction; and
      processing a next segment until there are no further segments.

21. The system of claim 20, wherein the static timing engine is further structured to proceed directly to the processing of the next segment in response to the current segment not having a bounded history.

22. The system of claim 20, wherein the static timing engine is further structured to propagate the history bounds without a gating restriction in response to the history bounds are not downstream from the gating restriction.

23. The system of claim 20, wherein time data of the modeled timing data variation includes a delay value.

* * * * *